W. J. Alexander,
Hame Fastener,
No. 60,319. Patented Dec. 11, 1866.

Witnesses.
Edward H. Knight
Thomas J. Hurelle

Inventor.
W. J. Alexander
by Munn & Co.
Attorneys

United States Patent Office.

IMPROVED HAME FASTENING.

W. J. ALEXANDER, OF MANCHESTER, IOWA.

Letters Patent No. 60,319, dated December 11, 1855.

The Schedule referred to in these Letters Patent and making part of the same.

TO ALL WHOM IT MAY CONCERN:

Be it known that I, W. J. ALEXANDER, of Manchester, in the county of Delaware, and State of Iowa, have invented a new and Improved Hame Fastening; and I do hereby declare the following to be a full, clear, and exact description of the same, sufficient to enable one skilled in the art to which the invention appertains to make use of it, reference being had to the accompanying drawings which form a part of this specification, and in which—

Figure 3:
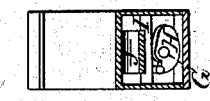
Figure 1:
Figure 2:
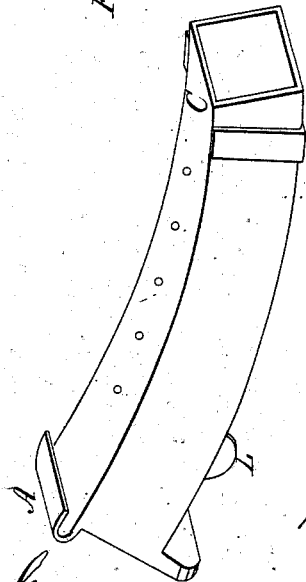

Figure 1 is a perspective view.
Figure 2 is a longitudinal section.

This device is for fastening the harness upon the collar, and consists of two portions attached to the respective hames, one slipping into the other and fastening therein by the engagement of a spring-catch with recesses in the socket. The catch-piece is detached from the socket by a peculiar motion, and the whole is metallic and intended to prevent the fastening from being gnawed and destroyed, as is frequently the case with mule harness.

In the drawings, A A, represent the ends of the two hames, B, is a catch-piece fastened to the loop of one hame, and C is the socket-piece fastened to the loop of the other hame. The catch-piece B is made of such size and form as to slip within the socket C; they are both somewhat curved so as to correspond to the shape of the collar against which the socket abuts, and the spring-catch D, engages with the notches E on the interior of the socket, so as to prevent the detachment until the spring is lifted. The means for raising the spring and unfastening the catch is afforded by the button, F, at the end of the catch-piece, and it is so constructed that it requires a double motion to enable it to act upon the spring-catch; on the end of the shaft, G, is an eccentric, H, which when it is withdrawn out of contact with the pin, I, may be rotated against the spring, J, which is pivotted at K; the depression of the bow of the spring by the revolution of the eccentric, H, has the effect of raising the catch out of contact with the notches, and the piece, B, may then be withdrawn from the socket, C. The pin, L, is used to limit the penetration of the piece, B, and the spring, M, tends to keep the button up against the piece, B, and rotated so as to enable the eccentric to reach the pin, I, where it is locked.

The operation is as follows: The pieces, B C, being attached to the loops on the lower ends of the respective hames, the latter are laid over the collar and catch-piece, B is slipped into the socket C, the catch D, engaging with the notches E, the first time it is placed on the collar of the mule, the pin L is removed, and the piece B is pushed in until the hames are tight enough, the pin L is then placed in position to act as a gauge as long as the gears are used upon the same animal. As the withdrawing arrangement requires a rotary followed by a longitudinal motion, it is not within the bounds of probability that the animals will succeed in unfastening their hames for themselves, or for each other, which is a common occurrence when they are fastened in the usual manner by a leather thong or strap, it is more apt to occur with mule teams, but its facility and security recommend it for fastening hames on the collars of horses and mules at both ends of the harness, if desired.

Having described my invention, what I claim as new, and desire to secure by Letters Patent, is—

1. The hame fastening consisting of the catch piece B, and the socket C, with the spring-catch D, and notches E, respectively and united to the loops of the hames substantially as and for the purpose described.

2. The arrangement for the button F, shaft G, eccentric H, and spring M, operating as described.

3. The pin L, as and for the purpose described.

W. J. ALEXANDER.

Witnesses:
CHAS. E. BRONSON
V. CHILDS.